United States Patent [19]

Kobayashi

[11] Patent Number: 4,812,018
[45] Date of Patent: Mar. 14, 1989

[54] LIQUID CRYSTAL DISPLAY ELEMENT HAVING ALIGNMENT FILM FORMED OF PLASMA-POLYMERIZED ACETONITRILE

[75] Inventor: Shunsuke Kobayashi, Tokyo, Japan

[73] Assignee: Fuji Photo Film Co., Ltd., Kanagawa, Japan

[21] Appl. No.: 174,309

[22] Filed: Mar. 28, 1988

[51] Int. Cl.$^4$ .............................................. G02F 1/13
[52] U.S. Cl. .................................. 350/341; 350/350 S
[58] Field of Search .............................. 350/341, 350 S

[56] References Cited

U.S. PATENT DOCUMENTS

| | | | |
|---|---|---|---|
| 4,391,491 | 7/1983 | Freer et al. | 350/341 |
| 4,561,726 | 12/1985 | Goodby et al. | 350/350 S X |
| 4,634,228 | 1/1987 | Iwasaki et al. | 350/350 S X |
| 4,705,359 | 11/1987 | Amstutz et al. | 350/341 |
| 4,744,639 | 5/1988 | Tsuboyama et al. | 350/341 X |
| 4,759,614 | 7/1988 | Yokokura et al. | 350/350 S |

*Primary Examiner*—Stanley D. Miller
*Assistant Examiner*—Richard Gallivan
*Attorney, Agent, or Firm*—Sughrue, Mion, Zinn, Macpeak & Seas

[57] ABSTRACT

A liquid crystal display element which comprises a pair of transparent electrode bases, each comprised of a transparent electrode, an alignment layer on each of the bases, the bases facing each other with the alignment layer thereof being inside, and a liquid crystal sealed between the bases, in which at least one of the alignment layers is formed by plasma polymerization of acetonitrile.

8 Claims, 1 Drawing Sheet

LIQUID CRYSTAL DISPLAY ELEMENT HAVING ALIGNMENT FILM FORMED OF PLASMA-POLYMERIZED ACETONITRILE

FIELD OF THE INVENTION

This invention relates to a liquid crystal display element for use in display devices, e.g., computers, word processors, high-quality televisions, etc. More particularly, it relates to an alignment layer which is laminated on a conductive base of these liquid crystal display elements.

BACKGROUND OF THE INVENTION

The TN (twisted nematic) type display mode using twisted nematic liquid crystals is now most commonly used as a liquid crystal display element in watches, electronic calculators, and the like. The rate of response attained by the state-of-the-art TN mode is 20 milliseconds at the highest.

Ferroelectric liquid crystals having high rates of response have recently been studied with the expectation of broadening the application of these display elements. In the display elements utilizing these ferroelectric liquid crystal materials, it is important that liquid crystal molecules should be aligned in a certain preferential direction parallel to a base surface. Alignment (orientation) of ferroelectric liquid crystals has conventionally been effected by applying a ferromagnetic field or utilizing a shear stress. However, these alignment techniques are of poor practical use in view of the required production process. Fukuda et al propose alignment from a spacer edge as disclosed in *Nature*, pp. 36–46 (July, 1983) and *Optronics*, pp. 64–70 (September, 1983), but the area where uniform alignment can be achieved is as narrow as 100 as 100 μm from the edge, thereby still leaving room for improvement for practical use.

On the other hand, alignment control for nematic liquid crystals or cholesteric liquid crystals has hitherto been carried out by oblique deposition of silicon oxide (SiO), as described in Japanese Patent Publication No. 12067/79, or coating of polyimide, etc., as described in Japanese Patent Application (OPI) No. 186932/86 (the term "OPI" as used herein means a "published unexamined patent application"), followed by rubbing with a specific cloth, etc. However, when such a technique is applied to ferroelectric liquid crystals, sufficiently uniform alignment cannot be assured. In recent years, it has been proposed to use, as the appropriate alignment layer, a polyimide film formed by vacuum evaporation, as disclosed in Japanese Patent Application (OPI) No. 138924/86, or glow discharge, as disclosed in Japanese Patent Application (OPI) No. 219029/86. These processes, however, do not always succeed in obtaining sufficient alignment, and the problem of reduction in contrast remains unsolved.

SUMMARY OF THE INVENTION

One object of this invention is to provide a high contrast liquid crystal display element, in which a ferroelectric liquid crystal is uniformly aligned between a pair of bases each having a transparent conductive film.

It has now been found that the above object can be accomplished by a liquid crystal display element which comprises a pair of transparent electrode bases, each comprised of a transparent electrode, an alignment layer on each of the bases, the bases facing each other with the alignment layer thereof being inside, and a liquid crystal sealed between the bases, in which at least one of the alignment layers is formed by plasma polymerization of acetonitrile.

In a preferred embodiment of the present invention, the liquid crystal display element further comprises an insulating layer between the transparent electrode and the above-described plasma polymerization film of acetonitrile.

BRIEF DESCRIPTION OF THE ACCOMPANYING DRAWINGS

FIGS. 1 and 2 illustrate the liquid crystal display elements obtained in Examples 1 and 2 of the present invention, respectively.

DETAILED DESCRIPTION OF THE INVENTION

Figure 1:
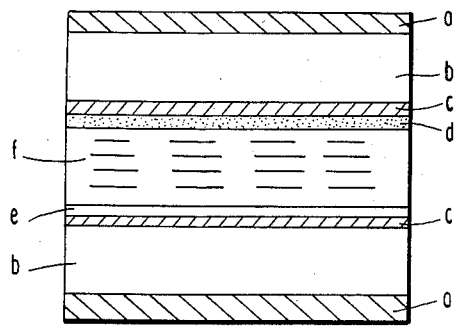

The plasma polymerization of acetonitrile can be carried out by known processes, for example, such as described in Hiroaki Kobayashi, *Kagaku no Rhoiki*, Extra No. 111, p. 59, "Process for Producing High Polymer Film by Plasma Polymerization".

The plasma polymerization film preferably has a thickness of from about 1,000 Å to about 6,000 Å, preferably 2,000 Å to 5,000 Å. The alignment layer formed by plasma polymerization of acetonitrile according to the present invention proved excellent for achievement of uniform alignment of ferroelectric liquid crystals in a given direction. The plasma polymerization film may be formed directly on the transparent electrode, or, alternatively, a film having another function, such as an electrically insulating film, may be provided on the transparent electrode and the plasma polymerization film of the invention may be formed thereon. In particular, in cases where an insulating film is provided between the transparent conductive layer and the alignment layer formed by plasma polymerization of acetonitrile, the requisite thickness of the alignment layer can be greatly reduced. That is, a thickness of from about 100 Å to about 1,000 Å (preferably 200 Å to 1,000 Å) would be enough to function as alignment layer in the case where an insulating film is employed. In this case, the plasma polymerization film of acetonitrile can be obtained by placing a base having an insulating layer in the vicinity of an electrode, reducing the pressure of the atmosphere, introducing an acetonitrile vapor, and effecting an electric discharge.

The insulating film which may be provided between the plasma polymerization film and the transparent electrode comprises organic polymers (e.g., polyimides, polyamides having an average molecular weight of about 10,000 to about 100,000, cellulose derivatives having an average molecular weight of about 10,000 to about 100,000, gelatin having an average molecular weight of about 10,000 to about 100,000, etc.), or inorganic materials (e.g., silicon nitride, silicon oxide, zirconium oxide, etc.), preferably a film prepared by the deposition or sputtering of $SiO_2$ when the inorganic materials are used. The thickness of the insulating film is preferably in the range of from 1,000 Å to 10,000 Å.

The plasma polymerization film of acetonitrile may be provided on the surface of either one of, or both of, the pair of bases. In the former case, it was confirmed that satisfactory alignment properties of liquid crystals can be assured by laminating an alignment layer commonly employed in the TN mode (e.g., a polyimide, polyamide having a molecular weight of 10,000 to 100,000 or polyvinyl alcohol film having a molecular weight of 10,000 to 1,000,000), on the other base.

The substrate materials for the transparent electrode bases include a glass base, a polymer film such as polyethylene terephthalate, polyethylene naphthalate, polycarbonate, polysulfone, etc.

The conductive layer for the transparent electrode bases preferably comprises an indium oxide, an indium-tin oxide, a palladium oxide, etc.

It is preferable that the alignment layer of the present invention is rubbed with synthetic fibers, such as nylon, polyester, polyacrylonitrile, etc., or natural fibers (e.g., cotton, wool, etc.). Light rubbing is particularly preferred. The rubbing may be carried out either on one or both of the two alignment layers, and preferably on both, in the case of light rubbing.

The liquid crystals which can be used in the present invention include nematic liquid crystals used in electronic calculators, watches, etc., as well as ferroelectric liquid crystals. The present invention is particularly effective when applied to ferroelectric liquid crystals. Liquid crystals having ferroelectric properties include those exhibiting a chiral smectic C phase (SmC*), H phase (SmH*), I phase (SmI*), J phase (SmJ*), K phase (SmK*), G phase (SmG*), or F phase (SmF*). Specific but non-limiting examples of the liquid crystal material to be used in the display elements of the present invention include "CS-1011", "1013" or "1015" produced by Chisso Corp., "ZLI-3488" or "3489" produced by Merck Co., "HS-98P" or "78P" produced by Teikoku Kagaku Sangyo, etc. If desired, these liquid crystal materials may contain dichromatic dyes, viscosity reducing agents, and the like, that are soluble in the liquid crystals. The typical examples of the dichromatic dyes include the compounds represented by the following formulae, etc.

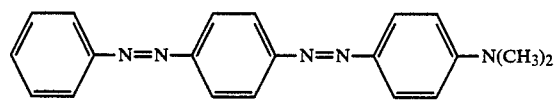

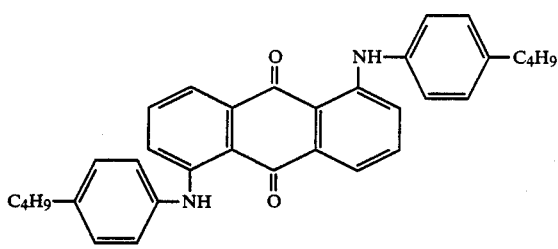

The cell thickness of the liquid crystal display elements is preferably in the range of from 0.5 to 15 μm, and more preferably of from 1 to 10 μm. A spacer for controlling the cell thickness may be placed on the alignment layer according to the present invention.

The present invention is now illustrated in greater detail by way of the following examples, but it should be understood that the present invention is not deemed to be limited thereto.

EXAMPLE 1

A transparent electrode base composed of a glass plate having formed thereon a transparent conductive layer made of an indium-tin oxide was placed in a glass-made bell-jar in which parallel electrode (5 cm×5 cm) were set at a distance of 4 cm therebetween. After the system was evacuated to $10^{-3}$ Torr, an acetonitrile vapor was fed thereto to reach 0.5 Torr and the rate of vapor flow was controlled at 20 ml/min. An electrical power of 20 W was applied to the electrodes for 10 minutes by the use of a high-frequency power source of 13.56 MHz to thereby form a plasma polymerization film having a thickness of 1,000 Å on the conductive layer.

On a transparent conductive layer comprising an indium-tin oxide of another glass plate was coated "Sun Ever 130", a polyimide type alignment (orientating) agent produced by Nissan Chemicals Ind., Ltd., followed by heat treatment at 170° C. for 60 minutes to form an alignment film.

Each of the plasma polymerization film and the "Sun Ever 130" film were once rubbed with nylon cloth and assembled into a liquid crystal cell having a cell thickness of 2 μm. "CS-1011", a ferroelectric liquid crystal produced by Chisso Corp., was sealed in the cell, heated to a temperature of 100° C. and then cooled to 40° C. at a rate of 1° C./min. The cell structure of the resulting liquid crystal display element is shown in FIG. 1, in which symbols a, b, c, d, e, and f indicate a polarizing plate, a glass base, a transparent electrode, a plasma polymerization film (alignment film), a polyimide type polymer film (alignment film), and a liquid crystal, respectively.

The resulting liquid crystal display element exhibited uniform alignment and satisfactory bistability when an electrical voltage of ±10 V was applied thereto.

EXAMPLE 2

A plasma polymerization film having a thickness of 1,000 Å of acetonitrile was formed on a transparent conductive base in the same manner as in Example 1. Polyvinyl alcohol ("Poval 103" produced by Kuraray Co., Ltd.) was coated in a thickness of 3,000 Å on another transparent conductive base as obtained in Example 1 and dried at 150° C. for 30 minutes to form an alignment film.

Both the alignment layers were rubbed three times with nylon cloth and assembled into a liquid crystal cell having a cell thickness of 3.5 μm. "ZLI-3488", a liquid crystal produced by Merck Co., was sealed in the cell, once heated to 95° C. and then cooled to 35° C. at a rate of 0.5° C./min.

The resulting liquid crystal display element was excellent in both alignment property and bistability.

EXAMPLE 3

A transparent conductive layer comprising an indium-tin oxide formed on a glass plate was coated with "PIX-1400" produced by Hitachi Chemical Co., Ltd., followed by heat treatment to form an insulating layer. The resulting base was placed in a glass-made bell-jar in which parallel electrodes (5 cm×5 cm) were set at a distance of 4 cm therebetween. After the system was evacuated to $10^{-3}$ Torr, an acetonitrile vapor was introduced therein to a pressure of 0.5 Torr, and the vapor flow rate was controlled at 20 ml/min. An electrical power of 20 W was applied to the electrodes for 1 minute by the use of a high-frequency power source of 13.56 MHz to form a plasma polymerization film having a thickness of 1,000 Å on the conductive layer.

On the transparent conductive layer comprising an indium-tin oxide of another glass plate was coated "Sun Ever 130" and heated at 170° C. for 60 minutes to obtain an alignment layer.

Figure 2:
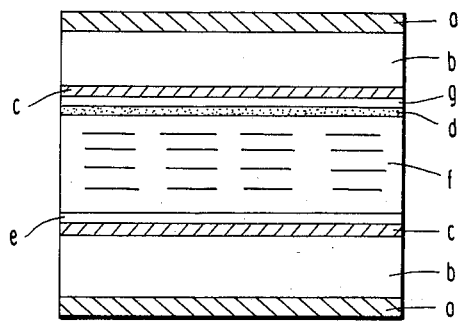

Both the plasma polymerization film and the "Sun Ever 130" film were rubbed once with nylon cloth and assembled into a liquid crystal cell having a cell thickness of 2 μm. "CS-1011" was sealed into the cell, once heated to 100° C., and then cooled to 40° C. at a rate of 1° C./min. The cell structure of the resulting liquid crystal display element is shown in FIG. 2, in which symbols a to f have the same meaning as in FIG. 1, and symbol e indicates an insulating layer.

The liquid crystal display element showed uniform alignment and exhibited satisfactory bistability when an electrical voltage of ±10 V was applied thereto.

EXAMPLE 4

The same base having formed thereon a plasma polymerization film (1,000 Å in thickness) of acetonitrile as obtained in Example 3 was used. On another transparent conductive layer comprising an indium-tin oxide as in Example 3 was coated "Poval 103" in a thickness of 2,000 Å and heat-treated at 150° C. for 30 minutes to form an alignment layer.

Both the plasma polymerization film and the "Poval 103" film were rubbed three times with nylon cloth and assembled into a liquid crystal cell having a cell thickness of 2.0 μm. "CS 1011" was sealed into the cell, once heated to 100° C., and then cooled to 35° C. at a rate of 0.5° C./min. The resulting liquid crystal display element exhibited uniform alignment and satisfactory bistability.

While the invention has been described in detail and with reference to specific embodiments thereof, it will be apparent to one skilled in the art that various changes and modifications can be made therein without departing from the spirit and scope thereof.

What is claimed is:

1. A liquid crystal display element which comprises a pair of transparent electrode bases, each comprised of a transparent electrode, an alignment layer on each of the bases, said bases facing each other with the alignment layer thereof being inside, and a liquid crystal sealed between the bases, in which at least one of the alignment layers is formed by plasma polymerization of acetonitrile.

2. A liquid crystal display element as claimed in claim 1, wherein said alignment layer formed by plasma polymerization of acetonitrile has a thickness of from about 1000 Å to about 6000 Å.

3. A liquid crystal display element as claimed in claim 1, wherein said element further comprises an insulating layer between the plasma polymerization film and the transparent electrode.

4. A liquid crystal display element as claimed in claim 3, wherein said alignment layer formed by plasma polymerization of acetonitrile has a thickness of from about 100 Å to about 1,000 Å.

5. A liquid crystal display element as claimed in claim 3, wherein said liquid crystal is a ferroelectric liquid crystal.

6. A liquid crystal display element as claimed in claim 3, wherein said insulating film is comprised of an organic polymer or an inorganic material.

7. A liquid crystal display element as claimed in claim 1, wherein said liquid crystal is ferroelectric liquid crystal.

8. A liquid crystal display element as claimed in claim 1, wherein the cell thickness of the liquid crystal display element is from 0.5 to 15 μm.

* * * * *